United States Patent
Gangina

(10) Patent No.: US 11,138,097 B2
(45) Date of Patent: Oct. 5, 2021

(54) AUTOMATED WEB TESTING FRAMEWORK FOR GENERATING AND MAINTAINING TEST SCRIPTS

(71) Applicant: Aetna Inc., Hartford, CT (US)

(72) Inventor: Rajeswara Rao Gangina, Avon, CT (US)

(73) Assignee: Aetna Inc., Hartford, CT (US)

( * ) Notice: Subject to any disclaimer, the term of this patent is extended or adjusted under 35 U.S.C. 154(b) by 0 days.

(21) Appl. No.: 16/580,609

(22) Filed: Sep. 24, 2019

(65) Prior Publication Data

US 2021/0089436 A1    Mar. 25, 2021

(51) Int. Cl.
    *G06F 11/36*    (2006.01)
(52) U.S. Cl.
    CPC ........ *G06F 11/3684* (2013.01); *G06F 11/368* (2013.01); *G06F 11/3672* (2013.01)
(58) Field of Classification Search
    None
    See application file for complete search history.

(56) References Cited

U.S. PATENT DOCUMENTS

| | | | |
|---|---|---|---|
| 8,239,831 B2 | 8/2012 | Brennan et al. | |
| 9,524,073 B1 * | 12/2016 | Fair | G06F 16/9574 |
| 10,146,524 B1 * | 12/2018 | Killmon | G06F 8/65 |
| 2004/0107415 A1 * | 6/2004 | Melamed | G06F 11/3684 |
| | | | 717/124 |
| 2004/0133880 A1 * | 7/2004 | Paternostro | G06F 11/3688 |
| | | | 717/124 |
| 2008/0010539 A1 * | 1/2008 | Roth | G06F 11/3688 |
| | | | 714/38.1 |
| 2008/0282235 A1 * | 11/2008 | Jadhav | G06F 11/3676 |
| | | | 717/131 |
| 2008/0320462 A1 * | 12/2008 | Bergman | G06F 11/3684 |
| | | | 717/168 |
| 2011/0271255 A1 * | 11/2011 | Lau | G06F 11/3668 |
| | | | 717/124 |
| 2012/0047488 A1 * | 2/2012 | Ambichl | G06F 11/3684 |
| | | | 717/124 |
| 2013/0041900 A1 * | 2/2013 | McCoy | G06F 16/20 |
| | | | 707/737 |

(Continued)

*Primary Examiner* — Qing Chen
(74) *Attorney, Agent, or Firm* — Leydig, Voit, & Mayer, Ltd.

(57) ABSTRACT

Methods for generating and maintaining test scripts for automated web testing are provided. A method for generating test scripts includes: receiving a series of steps defining a procedure; linking keywords in the series of steps with functional objects; dynamically arranging the functional objects according to the series of steps; generating the test scripts from the arranged functional objects; and sending the test scripts to a testing manager. A method for maintaining test scripts includes: determining a change in steps of metadata; identifying a position within a test script affected by the change in steps; updating row(s) within the test script based on the change in steps; and providing the test script to the testing manager. Embodiments of the disclosure enable a codeless automated web-testing framework based on a non-recording approach, which avoids manual coding or recording of test scripts, thereby accelerating website system testing and reducing associated time and costs.

20 Claims, 4 Drawing Sheets

(56) References Cited

U.S. PATENT DOCUMENTS

| | | | |
|---|---|---|---|
| 2013/0104105 A1* | 4/2013 | Brown | G06F 11/3684 |
| | | | 717/124 |
| 2013/0167116 A1* | 6/2013 | Mahmud | G06F 11/3672 |
| | | | 717/120 |
| 2015/0160942 A1* | 6/2015 | Bhuiya | G06F 8/70 |
| | | | 717/120 |
| 2015/0178382 A1* | 6/2015 | Srivastava | G06F 8/4434 |
| | | | 707/738 |
| 2018/0285246 A1* | 10/2018 | Tuttle | G06F 11/302 |
| 2020/0201615 A1* | 6/2020 | Biswas | G06F 21/53 |

* cited by examiner

AUTOMATED WEB TESTING FRAMEWORK FOR GENERATING AND MAINTAINING TEST SCRIPTS

BACKGROUND

Websites are tested in an automated fashion, but to set up automated testing, testers typically set up test scripts manually. Once the test scripts are set up manually, the maintenance of the test scripts is also manual. Manual test scripts are very sensitive to changes a developer makes to the user interface of the website. Agile software development is impeded since software development teams have to expend time and effort to manually create and maintain test scripts.

In setting up manual scripts for website testing, software developers use a recording approach to capture test cases. In a recording approach, all steps to be tested on the website are performed beforehand. During the performance, the specific steps are captured in the recording process and can then be run multiple times. A recording approach can be brittle because changes on a website will require an entire re-recording in order to edit test scripts to account for the changes to the website. The process of re-recording and editing the test scripts can be time consuming.

SUMMARY

In one embodiment, the disclosure provides a method for generating test scripts. The method may be performed by a system for automated web testing. The system may include a processor and a memory in communication with the processor. The method includes receiving, by a code generator server of the system, a series of steps defining a procedure to be taken when a website is opened. The method includes linking, by the code generator server, keywords in the series of steps with functional objects. The method includes dynamically arranging, by the code generator server, the functional objects according to the series of steps. The method includes generating, by the code generator server, the test scripts from the dynamically arranged functional objects. The method includes sending, by the code generator server, the test scripts to a testing manager of the system.

In another embodiment, the disclosure provides a method for maintaining test scripts. The method may be performed by a system for automated web testing. The system may include a processor and a memory in communication with processor. The method includes determining, by a code generator server of the system, a change in steps of metadata stored in a database in communication with the code generator server. The method includes identifying, by the code generator server, a position within a test script affected by the change in steps of the metadata. The method includes updating, by the code generator server, one or more rows within the test script in the database based on the change in steps of the metadata. The method includes providing, by the code generator server, the test script to a testing manager of the system.

In yet another embodiment, the disclosure provides a system for generating test scripts. The system includes a code generator server. The code generator server may include a processor and a memory in communication with the processor. The memory may include a non-transitory computer-readable medium having program instructions stored. When executed by the processor, the program instructions may cause the code generator server to: receive a series of steps defining a procedure to be taken when a website is opened; link keywords in the series of steps with functional objects; dynamically arrange the functional objects according to the series of steps; generate the test scripts from the dynamically arranged functional objects; and send the test scripts to a testing manager of the system.

DETAILED DESCRIPTION

Recording and re-recording to update test scripts can be a time consuming process and should be avoided if possible. Embodiments of the disclosure provide a system for codeless automated web-testing based on a non-recording approach where the system scours a website, page by page, to gather information and define data into a database for automatically creating scripts. An advantage to the non-recording approach is that when the website changes, e.g., a new control is added to the website or a specific change is made on a screen of a device displaying the website, then only the specific change on the website should be taken into account. The previous test script is updated with specific code of the website changes. Compared to re-recording, the automated addition of the new control is much faster in updating and maintaining test scripts.

Embodiments of the disclosure provide a codeless automated web-testing framework based on a non-recording approach. The automated web-testing framework operates based on a data driven approach with a combination of keywords using page object design pattern. In some embodiments, webpage details, as presented on screens of computing devices, and child objects within webpages are stored in a database as metadata. Additionally, actions that test scripts can perform on the webpage, e.g., enter data in text box, click a button, and so on, are stored in the database. The automated web-testing framework uses metadata and other data from the database to automatically generate scripts for testing a webpage. These scripts can then be executed on the web site for testing.

Embodiments of the disclosure provide an advantage of avoiding manual coding or recording of test scripts. Applications with frequent user interface (UI) changes can run into significant time constraints when recoding test scripts to test functionality. Embodiments of the disclosure enable faster set up of test scripts using metadata. By using metadata, maintaining current test scripts is easier since changes made to subsequent generation of the scripts are reflected only in metadata as opposed to requiring a programmer to manually recode changes. Embodiments of the disclosure allow re-use of test scripts by cloning them from metadata. Embodiments of the disclosure accelerate website system testing and regression testing, which over time reduces costs associated with software development projects.

As used herein, "regression testing" refers to a type of software testing to confirm that a recent program or code change has not adversely affected existing features. With regression testing, full or partial selection of already executed test cases are re-executed to ensure existing functionalities work fine.

Figure 1:
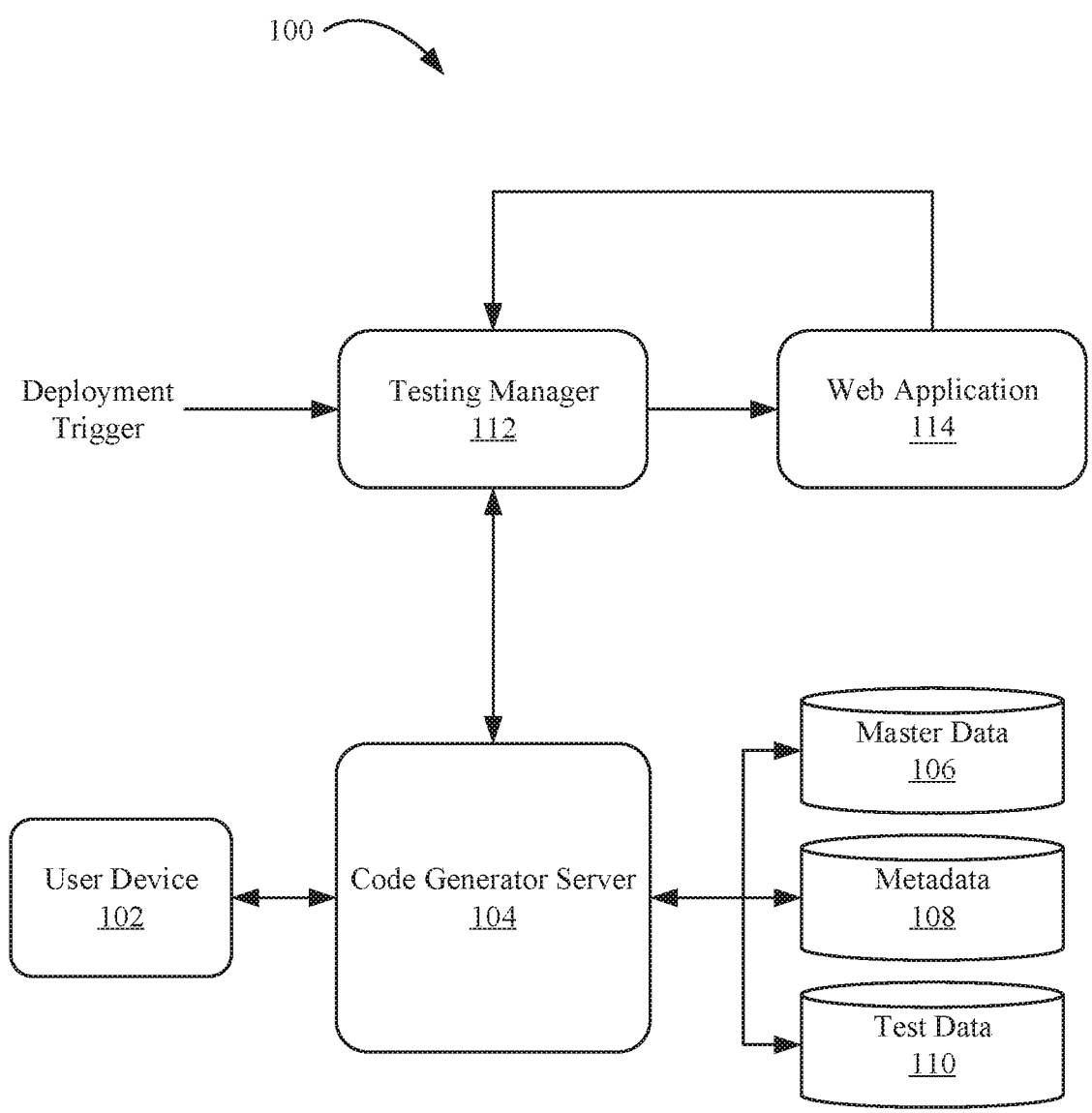
FIG. 1 illustrates a system for automated web-testing according to an embodiment of the disclosure.

FIG. 1 illustrates a system 100 for automated web-testing according to an embodiment of the disclosure. When a software code change for a web application is being deployed, the testing manager can be triggered automatically or manually to run the configured test suites. The test suites will in turn invoke the process of automated code generation for the number of test scripts configured in each test suite based on the latest metadata, master data and test data. The system 100 includes a user device 102, a code generator server 104, a database for storing master data 106, a database for storing metadata 108, a database for storing test data 110, a testing manager 112, and a web application (or website) 114. In the automated web-testing system 100, a user device 102 is a computing device, e.g., a laptop computer, a desktop computer, a mobile device, and so on. The code generator server 104, testing manager 112 and web application 114 are, or reside (e.g., as software program instructions) in, one or more servers with processor(s) and non-transitory computer readable medium for providing functionality attributed to each of these components. The master data 106, metadata 108, and test data 110 may be stored in one or more databases. Each of these types of data is separated graphically for illustration purposes, but the graphical depiction in FIG. 1 does not limit the organization of these types of data.

In system 100, the user device 102 is a computing device that allows a developer or a development team access and configure the different types of data, e.g., the master data 106, the metadata 108, and the test data 110, via the code generator server 104. The user device 102 can be used by the developer to configure the master data 106, metadata 108 and the test data 110. The master data 106 defines websites including page names and controls and navigations within pages in the website. The metadata 108 defines activities that should be performed when a website is opened. The metadata 108 includes a step by step process. Test data 110 includes specific configurations, settings, or data used in performing the step by step process of the metadata 108. Master data 106 for a new web page does not need to be configured manually as a one-time initial setup.

For example, a website has 10 pages. Each page has its own name, and the objects within each page along with the name of each page is defined and stored as master data 106. Any controls or reusable objects within the pages are also stored as master data 106. Examples of reusable objects that can be used across multiple web pages during automation include browserSleep, navigate URL, click, enterText, closeBrowser, and maximize Browser. Examples of controls used in web application 114 include button, hyperlink, text box, dropdown, and check box.

Master data 106 provides object definitions to be used in setting up metadata 108. Metadata 108 includes steps to be performed when the website is opened. The metadata 108 defines step by step processes to be performed. For example, the metadata 108 includes the following steps: (1) opening a home page; (2) enter username in a text box; (3) enter password in another text box; and (4) press submit username/password credentials within the home page. Master data 106 in this example will include the different objects within the home page, e.g., at least two textboxes for receiving username and password credentials, a "submit" button and controls associated with the "submit" button, and so on. Test data 110 for this example will include actual values for username/password pairs that can be used when performing the steps defined in the metadata 108.

The code generator server 104 uses information in each of the master data 106, the metadata 108, and the test data 110 to dynamically generate test scripts for testing the website. The number of test scripts generated is configured in the metadata 108. A grouping of test scripts is called a package.

The testing manager 112 receives test scripts from the code generator server 104 and starts running or executing the test scripts. In an embodiment, the testing manager 112 may be a test management tool, like IBM® Rational Quality Manager (RQM). The test scripts being created can be selenium scripts or any other open-source test scripting.

The testing manager 112 engages the web application 114 based on the items being tested in the test scripts. The web application 114 reports successes and failures of different items being tested in the test scripts to the testing manager 112 as different tests are completed. If the website is not behaving as expected, the test script will fail. If the script itself is defective, the tester can identify why the test script failed and take corrective actions.

In another example, every website has something to do, e.g., control a sizing of a textbox, selecting items from a dropdown menu, etc. Each of these is defined in the master data 106. The metadata 108 provides sequential steps to be performed in testing the website, e.g., (1) log in, (2) navigate to second page, (3) select second item in dropdown on second page. The code generator server 104 takes the steps in the metadata 108 to create test scripts based on functions defined in the master data 106.

Figure 2:
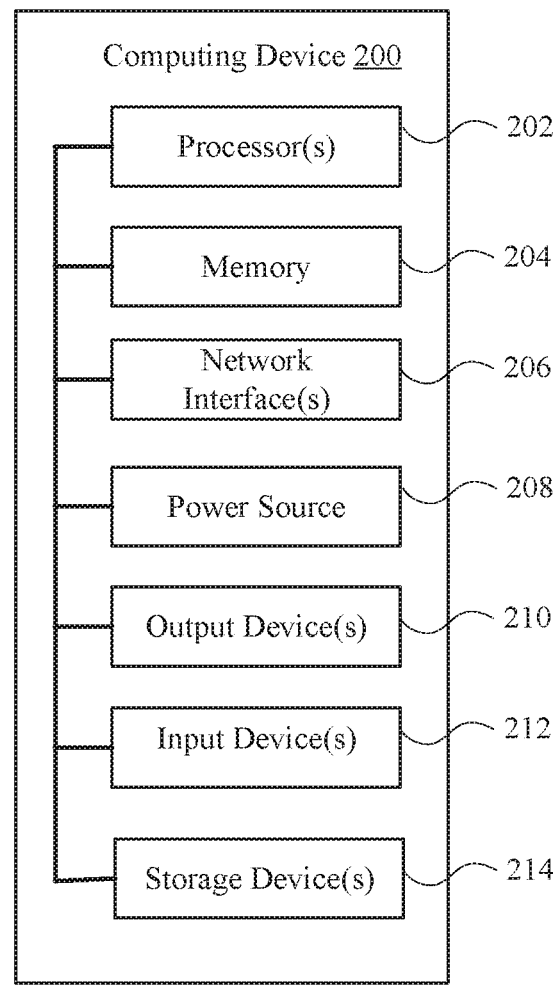
FIG. 2 illustrates a computing device according to an embodiment of the disclosure.

FIG. 2 is a block diagram illustrating basic hardware components of a computing device 200, according to some example embodiments. The computing device 200 is an architecture for one or more servers for implementing the code generator server 104, testing manager 112, and web application 114. The computing device 200 also is an architecture for the user device 102. The computing device 200 may include one or more processors 202, memory 204, network interfaces 206, power source 208, output devices 210, input devices 212, and storage devices 214. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within the device 200 during operation. In some embodiments, memory 204 includes volatile memories such as RAM, dynamic random access memories (DRAM), and static random access memories (SRAM). Memory 204 also maintains program instructions for execution by the processor 202 and serves as a conduit for other storage devices (internal or external) coupled to the computing device 200 to gain access to processor 202.

Storage device 214 includes one or more non-transient computer-readable storage media configured for long-term storage of information. In some embodiments, the storage device 214 includes floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, optical transceivers, radio frequency transceivers, or any other type of device that can send and receive information. Examples of network interfaces 206 include radios compatible with several Wi-Fi standards, 3G, 4G, 5G, Long-Term Evolution (LTE), Bluetooth®, etc.

Power source 208 provides power to the computing device 200. Examples include rechargeable or non-rechargeable batteries utilizing nickel-cadmium or other suitable material. Power source 208 may include a regulator for regulating power from the power grid in the case of a device plugged into a wall outlet.

The computing device 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 200.

The computing device 200 may also be equipped with one or more input devices 212. Input devices 212 are configured to receive input from a user or the environment where the computing device 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device.

The disclosed framework, systems and methods leverage one or more database to create automated test scripts and provide a domain and account agnostic framework for web and mobile applications automation. The disclosed embodiments further dispense with the need to write code to develop automation scripts. Rather, users may simply add new rows in a table to develop new scripts for script-less automation. The disclosed framework may be accessed through a Web user interface (UI), which facilitates script development, generation, and/or maintenance for non-technical users without specialized training. The embodiments described herein may be integrated with test management tools to track quality assurance (QA) results at an account level. The system is flexible to fit into a development process and provide cross-browser compatibility testing. Automated report and log generation provide execution status. Agile automation techniques are supported, and the database(s) utilized in the disclosed systems and methods store and secure the data, keywords, and objects used for the automation scripts.

Figure 3:
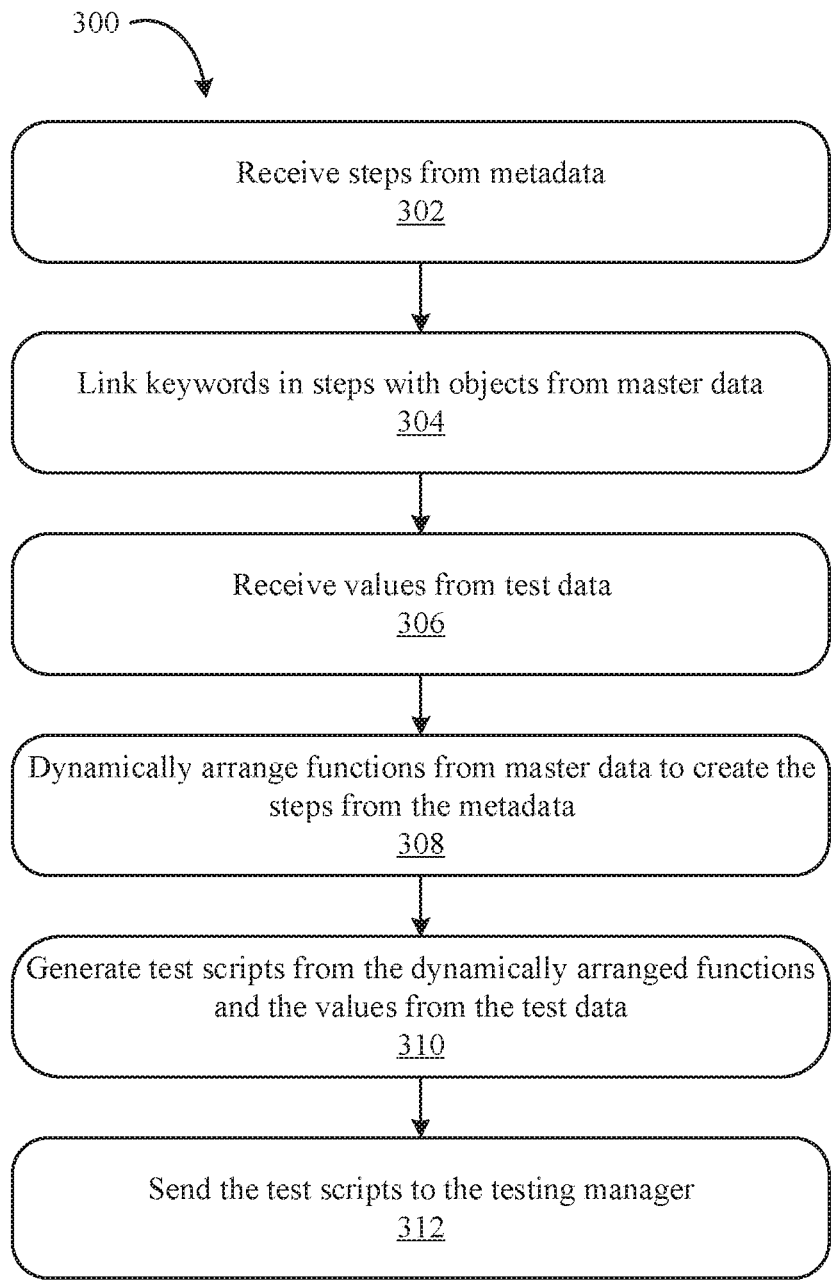
FIG. 3 is a flow diagram illustrating steps for generating test scripts according to an embodiment of the disclosure.

FIG. 3 is a flow diagram illustrating a process 300 for generating test scripts according to an embodiment of the disclosure. At step 302, the code generator server 104 receives one or more steps from the metadata 108. The one or more steps define what should be done when a website is opened and describes a testing process for certain features or combination of features within the website, as previously described above.

At 304, the code generator server 104 links keywords in the one or more steps with functional objects from the master data 106. Keywords operate on the objects, so e.g., "left click the textbox" includes an object "textbox" with properties and functionality defined within the master data 106, and "left click" is a keyword for a specific action to be performed on the "textbox" object.

At 306, the code generator server 104 receives values from the test data 110. These values represent specific configurations, settings, and values variables should take when performing the steps received at step 302. Examples of values include specific usernames and passwords, which menu items should be selected in a dropdown menu, what search terms should be entered in a search box, etc.

At 308, the code generator server 104 dynamically arranges functional descriptions from the master data 106 to create the ordered steps from the metadata 108. At 308 of process 300, the functional objects are dynamically arranged according to the series of steps.

At 310, the code generator server 104 generates test scripts from the dynamically arranged functions of 308 (e.g., the dynamically arranged functional objects) and the values received from the test data 110. In an embodiment, the test script generated is a selenium script.

At 312, the code generator server 104 sends the test scripts to the testing manager 112. The testing manager 112 can execute the test scripts via the web application 114 at once in a batch mode. In batch mode, multiple machines or environments are tested in parallel using the test scripts, and documentation or results of the testing are returned to the testing manager 112.

In some embodiments, a test automation framework is the scaffolding (e.g., SCAF framework) that provides an execution environment for automation test scripts. The SCAF framework may include at least two layers: FRAMEWORK.TOOLS and FRAMEWORK.UTILITIES.

In one embodiment, the database(s) utilized by the FRAMEWORK.UTILITIES and FRAMEWORK.TOOLS layers may employ a SQL database architecture. One or more databases may be used in the disclosed systems and methods. An example of a SQL database table structure that may be used with any of the disclosed systems and methods is provided below, followed by definitions for the various tables of the example.

| SNO | Table Name | Table Description |
|---|---|---|
| 1 | APPL | Application |
| 2 | BROWSER | Browser |
| 3 | ENV | Environment |
| 4 | OBJECT | Object |
| 5 | RELEASE | Release |
| 6 | SCREEN | Screen |
| 7 | SCRNOBJ | ScreenObject |
| 8 | TESTSUIT | TestSuite |
| 9 | TESTSX | TestSuiteExecution |
| 10 | TESTCASE | TestCase |
| 11 | TESTCEX | TestCaseExecution |
| 12 | TESTDS | TestDataSet |
| 13 | TESTSTEP | TestStep |
| 14 | TSTSPEX | TestStepExecution |

These tables may be located in the master data database 106, the metadata database 108, and the test data database 110. In alternative embodiments different databases and database structures are used. Each of the example SQL tables listed above is further described below.

APPL Table

In one embodiment, the APPL table may require only a one-time setup. All of the application (e.g., web application 114) details are stored in this table. Any new application whose testing is to be automated according to the disclosed systems and methods may be defined within the APPL table, as follows:

| Parameter | Description |
| --- | --- |
| APPL_ID | Unique ID generated for each application |
| APPL_NM | Name of the application |
| APPL_DESC | Application description |
| APPL_CREATED_DT | Creation date |
| APPL_CREATEDBY_ID | Created by |
| APPL_MODIFIED_DT | Modified date |
| APPL_MODIFIEDBY_ID | Modified by |

BROWSER Table

In one embodiment, the BROWSER table may require only a one-time setup. All of the browser name and code details of the browser for automated testing of the application (e.g., web application 114) according to the disclosed systems and methods are stored in the BROWSER table, as follows:

| Parameter | Description |
| --- | --- |
| BROWSER_ID | The unique ID generated for each browser |
| BROWSER_NM | Browser name |
| BROWSER_DESC | Description of the browser |
| BROWSER_CD | Browser code identified by automation script |
| BROWSER_CREATED_DT | Created date |
| BROWSER_CREATEDBY_ID | Created by |
| BROWSER_MODIFIED_DT | Modified date |
| BROWSER_MODIFIEDBY_ID | Modified by |

ENV Table

In one embodiment, the ENV table may require only a one-time setup. All the environment variables for automated testing of the application (e.g., web application 114) according to the disclosed systems and methods are stored in the ENV table, as follows:

| Parameter | Description |
| --- | --- |
| ENV_ID | Unique ID generated for each configured environment |
| APPL_ID | Unique ID generated for each application |
| ENV_NM | Environment name (e.g., QA, DEV, etc.) |
| ENV_URL_NM | URL for the respective environment |
| ENV_CREATED_DT | Created date |
| ENV_CREATEDBY_ID | Created by |
| ENV_MODIFIED_DT | Modified date |
| ENV_MODIFIEDBY_ID | Modified by |

RELEASE Table

In one embodiment, the RELEASE table may require only a one-time setup. For automated testing of the application (e.g., web application 114) according to the disclosed systems and methods, a unique ID for each release is created and mapped to any number of test suites to facilitate tracking of release versions, as follows:

| Parameter | Description |
| --- | --- |
| RELEASE_ID | Unique ID generated for each release configuration |
| RELEASE_NM | Release name |
| RELEASE_DESC | Description of the release |
| RELEASE_CREATED_DT | Created date |
| RELEASE_CREATEDBY_ID | Created by |
| RELEASE_MODIFIED_DT | Modified date |
| RELEASE_MODIFIEDBY_ID | Modified by |

TESTSUIT Table

In one embodiment, one, or a plurality of, test suites are created in the TESTSUIT table for automated testing of the application (e.g., web application 114) according to the disclosed systems and methods, as follows:

| Parameter | Description |
| --- | --- |
| TESTSUIT_ID | Unique ID generated for each test suite |
| TESTSUIT_NM | Test suite name |
| APPL_ID | Application ID to be configured for the test suite |
| ENV_ID | Environment ID to be configured for the test suite |
| BROWSER_ID | Browser ID to be configured for the test suite |
| RELEASE_ID | Release ID to be configured for the test suite |
| TESTSUIT_CREATED_DT | Created date |
| TESTSUIT_CREATEDBY_ID | Created by |
| TESTSUIT_MODIFIED_DT | Modified date |
| TESTSUIT_MODIFIEDBY_ID | Modified by |
| TESTSUIT_EXECUTE_IND | Execute column to be marked as "Y" for execution; if not, marked as "N" |

TESTSX Table

In one embodiment, the test cases to be mapped in a test suite for automated testing of the application (e.g., web application 114) according to the disclosed systems and methods are added in the TESTSX table, as follows:

| Parameter | Description |
| --- | --- |
| TESTSUIT_ID | Suite ID for which test cases need to be added |
| APPL_ID | Application ID to be configured for this suite |
| TESTCASE_ID | Test case ID to be added in this test suite |
| TESTSX_STATUS_NM | Description/Status, if required, for the suite |
| TESTSX_ORDER_NO | Order in which test cases need to be executed |
| TESTSX_START_DTS | Start date, if required |
| TESTSX_END_DTS | End date, if required |
| TESTSX_ERROR_CD | Error code to store, if required |
| TESTSX_ERRORDT_TXT | Error text to store, if required |
| TESTSX_EXECUTE_IND | Execute column to be marked "Y" for execution; if not, can be empty or marked as "N" |
| TESTSX_INTRTNS_NO | Iteration number (default = 1) |
| TESTSX_ONERROR_TXT | If required |
| TESTSX_CREATED_DT | Created date |
| TESTSX_CREATEDBY_ID | Created by |
| TESTSX_MODIFIED_DT | Modified date |
| TESTSX_MODIFIEDBY_ID | Modified by |

TESTCASE Table

In one embodiment, the test cases to be automated are created in the TESTCASE Table, with the test case name and its details for automated testing of the application (e.g., web application 114) according to the disclosed systems and methods, as follows:

| Parameter | Description |
| --- | --- |
| TESTCASE_ID | Unique ID generated for each test case created |
| APPL_ID | Application ID to be mapped for each test case |
| TESTCASE_NM | Test case name |
| TESTCASE_CREATED_DT | Created date |
| TESTCASE_CREATEDBY_ID | Created by |
| TESTCASE_MODIFIED_DT | Modified date |
| TESTCASE_MODIFIEDBY_ID | Modified by |

TESTCEX Table

In one embodiment, the TESTCEX table defines the order of the test step names (e.g., keywords, as described above for step 304) to be added and/or executed for a test case for automated testing of the application (e.g., web application 114) according to the disclosed systems and methods, as follows:

| Parameter | Description |
| --- | --- |
| TESTCASE_ID | Unique ID of a test case for which test steps need to be added |
| TESTCASE_TSORDER_NO | Order in which test steps (keywords) needs to be executed |
| TESTSTEP_ID | Test step ID to be added for a test case |
| TESTDS_ID | Data ID for each test step (keyword) |
| TESTCEX_CREATED_DT | Created date |
| TESTCEX_CREATEDBY_ID | Created by |
| TESTCEX_MODIFIED_DT | Modified date |
| TESTCEX_MODIFIEDBY_ID | Modified by |

TESTSTEP Table

In one embodiment, details of all the test steps (e.g., keywords, as described above for step 304) to be defined are added to the TESTSTEP table for automated testing of the application (e.g., web application 114), as follows:

| Parameter | Description |
| --- | --- |
| TESTSTEP_ID | Unique ID generated for a test step (keyword) |
| TESTSTEP_NM | Test step (keyword) name |
| APPL_ID | Application ID |
| TESTSTEP_CREATED_DT | Created date |
| TESTSTEP_CREATEDBY_ID | Created by |
| TESTSTEP_MODIFIED_DT | Modified date |
| TESTSTEP_MODIFIEDBY_ID | Modified by |

TESTSPEX Table

In one embodiment, the steps to be performed in each test step (e.g., keyword) for automated testing of the application (e.g., web application 114) are added as rows in the TESTSPEX table, as follows:

| Parameter | Description |
| --- | --- |
| TESTSTEP_ID | Unique ID generated for each test step (keyword) to be added |
| TSTSPEX_STEP_NO | Step number |
| SCRNOBI_ID | Screen object ID reference to pick the object |
| TSTSPEX_OPERTN_TXT | Operation (action) to be performed on the object; predefined/custom function name |
| TSTSPEX_STEP_DESC | Test step description |
| TSTSPEX_CONDTN_TXT | Condition, if any, for IF, loops, return values, etc. |
| TSTSPEX_INPUT_TXT | Data to be passed |
| TSTSPEX_SCSHOT_IND | Screenshot, if required, to be updated as "Y" |
| TSTSPEX_CREATED_DT | Created date |
| TSTSPEX_CREATEDBY_ID | Created by |
| TSTSPEX_MODIFIED_DT | Modified date |
| TSTSPEX_MODIFIEDBY_ID | Modified by |

SCREEN Table

In one embodiment, the SCREEN table defines the screen names used for objects and data for automated testing of the application (e.g., web application 114), as follows:

| Parameter | Description |
| --- | --- |
| SCREEN_ID | Unique ID generated for each screen |
| APPL_ID | Application ID |
| SCREEN_NM | Screen name |
| SCREEN_DESC | Description of the screen |
| SCREEN_CREATED_DT | Created date |
| SCREEN_CREATEDBY_ID | Created by |
| SCREEN_MODIFIED_DT | Modified date |
| SCREEN_MODIFIEDBY_ID | Modified by |

OBJECT Table

In one embodiment, the OBJECT table defines the object names used for objects and data for automated testing of the application (e.g., web application 114), as follows:

| Parameter | Description |
| --- | --- |
| OBJECT_ID | Unique ID generated for each object |
| OBJECT_NM | Object name |
| OBJECT_DESC | Description of the object |
| OBJECT_XPATH_TXT | Object XPath |
| OBJECT_CREATED_DT | Created date |
| OBJECT_CREATEDBY_ID | Created by |
| OBJECT_MODIFIED_DT | Modified date |
| OBJECT_MODIFIEDBY_ID | Modified by |

SCRNOBJ Table

In one embodiment, the SCRNOBJ table is utilized to map the screens in the SCREEN table and the objects captured for those screens in the OBJECT table for automated testing of the application (e.g., web application 114), as follows:

| Parameter | Description |
| --- | --- |
| SCRNOBJ_ID | Unique ID generated for each screen and object mapping |
| SCREEN_ID | Object name |
| OBJECT_ID | Object description |
| SCRNOBJ_INPUTDO_NO | Object XPath |
| SCRNOBJ_CREATED_DT | Created date |
| SCRNOBJ_CREATEDBY_ID | Created by |
| SCRNOBJ_MODIFIED_DT | Modified date |
| SCRNOBJ_MODIFIEDBY_ID | Modified by |

In some embodiments, the FRAMEWORK.TOOLS layer reads an Objects_keywords schema and automatically creates test cases and the corresponding keywords (e.g., as described above for step 304) under SCAF.TestCases and SCAF.Keywords directories, respectively. In one embodiment, the components under the FRAMEWORK.TOOLS layer include: GeneratorCumRunner, KeywordGenerator, TestCaseGenerator, and BatchRunner.

GeneratorCumRunner

In one embodiment, the GeneratorCumRunner component is the driver script. The GeneratorCumRunner component interacts with all other layers and automatically creates the keywords (e.g., as described above for step 304) and test cases for automated testing of the application (e.g., web application 114). All the test suites which are marked as "Y" (e.g., "Yes") in the above-described TESTSUIT table are executed and an Excel report is generated and emailed to respective stakeholders.

KeywordGenerator

In one embodiment, the KeywordGenerator component reads the above-described TESTSTEP and TSTSPEC tables and creates new keywords (e.g., in the form of a Java file, as described for step 304) for automated testing of the application (e.g., web application 114). Additionally, or alternatively, if any existing keyword(s) have changed, the KeywordGenerator updates existing keyword(s).

In some embodiments, the KeywordGenerator component is a standalone component that can be executed separately where, for instance, there is a need to generate the keywords alone for automated testing of the application (e.g., web application 114). Newly created keywords under the grouping of test scripts (e.g., the keywords package) contain the operations/actions that have to be performed for each test case component/page wise for automated testing of the application (e.g., web application 114).

TestCaseGenerator

In one embodiment, the TestCaseGenerator component reads the above-described TESTCASE table and fetches all the unique test case names from the TESTCASE table.

In some embodiments, new test cases are created as, for instance, Java files. Additionally, or instead, existing test cases (e.g., Java files) are updated. These creation and/or updating processes are performed for all unique test cases fetched from the TESTCASE table for automated testing of the application (e.g., web application 114) according to the disclosed systems and methods. New test cases interact with an ExecutionHandler from the Framework. Utilities layer and execute the corresponding keywords (e.g., as described above with reference to step 304 of FIG. 3) associated with the test case. In one embodiment, the TestCaseGenerator is a standalone layer that can be executed separately to generate test cases for automated testing of the application (e.g., web application 114).

BatchRunner

In one embodiment, the BatchRunner component reads the above-described TESTSUIT table and executes all the test cases within the TESTSUIT table marked as "Y" (e.g., "Yes").

In some embodiments, the FRAMEWORK.UTILITIES layer includes four components which read the above-provided tables from the database(s) and provide necessary information for the keywords (e.g., as described above with reference to step 304) and the test cases for automated testing of the application (e.g., web application 114). The four components under this layer include: ExecutionHandler, DataHandler, ObjectHandler, and ErrorHandler.

ExecutionHandler

In one embodiment, the ExecutionHandler components reads a config.properties file in an automated application (e.g., web application 114) testing project and loads all the necessary environment variables from, for instance, the above-described ENV table. The ExecutionHandler component is responsible for Start/Stop of a Web driver, executing all the keywords (e.g., as described above with reference to step 304 of FIG. 3) corresponding to the test case, and creating an Excel report containing the execution status details for automated testing of the application.

DataHandler

In one embodiment, the DataHandler component contains the code to connect to the database(s) for automated testing of the application (e.g., web application 114). The DataHandler component reads respective table(s) of the above-described tables and provides the necessary data for the keywords (e.g., as described above for step 304) and the test cases for automated testing of the application.

ObjectHandler

In one embodiment, the ObjectHandler component contains multiple components which function as a common repository for maintaining the code for all common operations being performed for automated testing of the application (e.g., web application 114). All the reusable functions like Enter Text, Click, Select from Drop Down, Verify Text, etc. are maintained in ObjectHandler.

ErrorHandler

In one embodiment, the ErrorHandler component provides exception handling for automated testing of the application (e.g., web application 114) according to the disclosed systems and methods.

Figure 4:
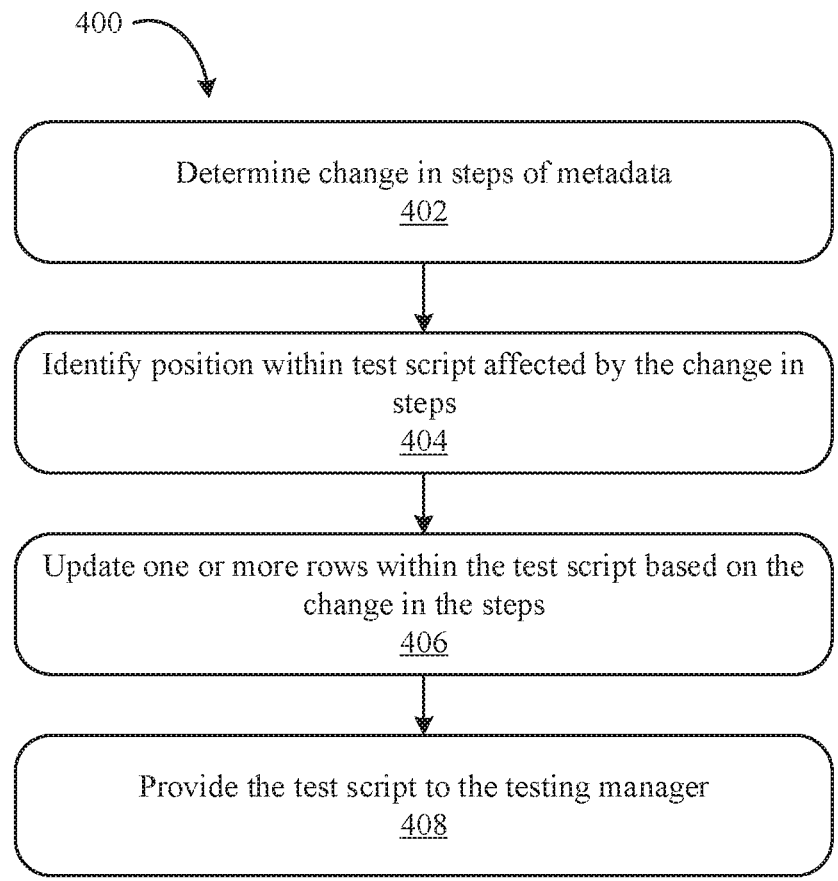
FIG. 4 is a flow diagram illustrating steps for maintaining test scripts according to an embodiment of the disclosure.

FIG. 4 is a flow diagram illustrating a process 400 for maintaining a test script according to an embodiment of the disclosure. At 402, the code generator server 104 determines that there is a change in steps in the metadata 108. As shown in FIG. 1, a deployment trigger by testing manager 112 leads code generator server 104 to determine that such a change has occurred. Code generation is triggered manually or in automated fashion. For instance, when a software code change for web application 114 is being deployed, triggering the testing manager 112 occurs in either of two ways: either (1) the deploy (devops) process would trigger the testing manager 112, or (2) the testing manager 112 can be triggered manually to run the configured test suites, which will in turn invoke the process of automated code generation for the number of test scripts configured in each test suite based on the latest metadata 108, master data 106 and test data 110. In the case of an automated process where, once a change is made in a site, code generator server 104 determines if there are new objects (e.g., functional objects) in the site. For a manual process, once the user is done configuring metadata 108, the user sends a signal to code generator server 104 to begin generating the test scripts. In either the automated or manual case, code generation is triggered whenever changes are deployed on the web application 114 (e.g., the website).

In an embodiment, a new feature is added to a website and expected interactions with the new feature are incorporated in the testing process. In another embodiment, an existing feature is updated with different functionality, e.g., a drop-down menu is converted to radio button selection in an unordered list, and so on.

At 404, the code generator server 104 identifies one or more positions within the test script affected by the change in steps of 402.

At 406, the code generator server 104 updates one or more rows within the test script based on the change in the steps. The code generator server 104 can add and/or remove rows within the test script based on the change in the steps. In some embodiments, such processes at 406 are implemented to update the metadata stored in a database in communication with the code generator server 104.

At 408, the code generator server 104 provides the test script to the testing manager 112.

Embodiments of the disclosure allow in-sprint automated system testing. Some advantages include: (1) Current scripts can be changed easier for large count of impacted scripts via an online portal; (2) System test scripts can be re-used as regression/user acceptance testing (UAT) scripts and vice versa; (3) 20 to 30% of effort is saved for the applications that are planning to automate testing; (4) Estimated savings of 10-15% on overall system and regression testing; (5) Combining UAT with system testing or best coverage of scripts; (6) Re-usability of Functions within scripts; (7) Avoidance of duplicate test scripts; and (8) No manual scripting. In practice, the embodiments of the disclosure provide substantial savings of human resources in terms of testing time and effort (e.g., a reduction in regression testing effort from 8 days to 3 days). This, in turn, beneficially reduces the costs incurred, and increases the efficiency of resources utilized for, test automation (e.g., for every 5 test resources, one unit of resource time may be saved).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for generating test scripts, the method performed by a system for automated web testing, the system including a processor and a memory, the method comprising:
   receiving, by a code generator server of the system, a series of steps defining a procedure to be taken when a website is opened;
   linking, by the code generator server of the system, keywords in the series of steps with functional objects;
   dynamically arranging, by the code generator server of the system, the functional objects according to the series of steps;
   generating, by the code generator server of the system, the test scripts from the dynamically arranged functional objects;
   sending, by the code generator server of the system, the test scripts to a testing manager of the system; and
   re-using, by the code generator server of the system, the test scripts by cloning the test scripts from metadata, wherein webpage details, as presented on screens of computing devices, and child objects within webpages are stored in a database as the metadata.

2. The method according to claim 1, wherein the series of steps are defined in a database of the metadata and the functional objects are defined in a database of master data.

3. The method according to claim 2, wherein a number of test scripts generated is defined in the database of the metadata.

4. The method according to claim 1, wherein the functional objects include controls within the website.

5. The method according to claim 1, further comprising:
   determining, by the code generator server of the system, a change in the series of steps;
   identifying, by the code generator server of the system, a position within a first test script in the test scripts;
   updating, by the code generator server of the system, one or more rows within the first test script in the test scripts based on the change in the series of steps; and
   providing, by the code generator server of the system, the first test script in the test scripts to the testing manager of the system.

6. The method according to claim 5, wherein the change in the series of steps is an addition to the series of steps and updating the one or more rows within the first test script in the test scripts includes adding new rows to the first test script in the test scripts at the position within the first test script in the test scripts.

7. The method according to claim 5, wherein the change in the series of steps is determined in response to a deployment trigger by the testing manager of the system, and wherein the deployment trigger occurs automatically in response to a code change for a web application.

8. A method for maintaining test scripts, the method performed by a system for automated web testing, the system including a processor and a memory, the method comprising:
   determining, by a code generator server of the system, a change in steps of metadata stored in a database in communication with the code generator server of the system;
   identifying, by the code generator server of the system, a position within a test script affected by the change in steps of the metadata;

updating, by the code generator server of the system, one or more rows within the test script in the database based on the change in steps of the metadata;

re-using, by the code generator server of the system, the test scripts by cloning the test scripts from the metadata, wherein webpage details, as presented on screens of computing devices, and child objects within webpages are stored in a database as the metadata; and providing, by the code generator server of the system, the test script to a testing manager of the system.

9. The method of claim 8, wherein the metadata defines step by step processes to be performed for the automated web testing.

10. The method of claim 8, wherein the metadata is configured to store a number of generated test scripts.

11. The method of claim 8, wherein the change in steps of the metadata is determined in response to a deployment trigger by the testing manager of the system.

12. The method of claim 11, wherein the deployment trigger by the testing manager of the system occurs automatically in response to a code change for a web application.

13. The method of claim 12, wherein determining the change in steps of the metadata comprises determining a presence of one or more new objects in a website.

14. The method of claim 11, wherein the deployment trigger by the testing manager of the system occurs manually.

15. The method of claim 14, wherein the manual deployment trigger includes a signal sent by a user to the code generation server of the system upon completion of a configuration of the metadata.

16. The method of claim 8, wherein the change in steps of the metadata includes a new feature added to a website.

17. The method of claim 8, wherein the change in steps of the metadata includes an update to an existing feature of a website.

18. A system for generating test scripts, comprising:

a code generator server including: a processor, and a memory in communication with the processor, wherein the memory includes a non-transitory computer-readable medium having program instructions stored therein which, when executed by the processor, cause the code generator server to:

receive a series of steps defining a procedure to be taken when a website is opened;

link keywords in the series of steps with functional objects;

dynamically arrange the functional objects according to the series of steps;

generate the test scripts from the dynamically arranged functional objects;

send the test scripts to a testing manager of the system; and re-use the test scripts by cloning the test scripts from metadata, wherein webpage details, as presented on screens of computing devices, and child objects within webpages are stored in a database as the metadata.

19. The system of claim 18, wherein when executed by the processor, the program instructions further cause the code generator server to:

determine a change in steps of the metadata stored in a database in communication with the code generator server, wherein the metadata defines step by step processes to be performed for automated web testing;

identify a position within a test script affected by the change in steps of the metadata;

update one or more rows within the test script in the database based on the change in steps of the metadata; and provide the test script to the testing manager of the system.

20. The system of claim 19, wherein the change in steps of the metadata is determined in response to a deployment trigger by the testing manager of the system, and wherein the deployment trigger occurs automatically in response to a code change for a web application.

* * * * *